United States Patent [19]
Clarke et al.

[11] 3,802,258
[45] Apr. 9, 1974

[54] TENSION MEASURING MEANS FOR SUBMARINE CABLES

[75] Inventors: Eric Fifield Stuart Clarke, Harrow; James Edwin Henry Cosier, Northolt; Jan Kolanowski; Peter Seaton Halls, both of London; Alexander Duncan Lindley Laidlaw, Harrow, all of England

[73] Assignee: The Post Office, London, England

[22] Filed: Aug. 16, 1971

[21] Appl. No.: 172,095

[30] Foreign Application Priority Data
Aug. 21, 1970  Great Britain .................. 40441/70

[52] U.S. Cl. .............................................. 73/143
[51] Int. Cl. ............................................. G01l 5/10
[58] Field of Search .............. 73/143, 141 A, 141 R

[56] References Cited
UNITED STATES PATENTS
942,006   11/1909  Morehead ........................ 73/143
2,597,751  5/1952   Ruge .......................... 73/141 A X
2,079,021  5/1937   Malcolm et al. .................... 73/143
3,358,500  12/1967  Flinth .......................... 73/141 A Primary Examiner—Jerry W. Myracle
Attorney, Agent, or Firm—Hall & Houghton

[57] ABSTRACT

A mounting arrangement for a shipboard cable engine for the laying or recovery of submarine cables is described. A respective mounting chassis is provided for each module of a plurality of modules containing cable traction and guide elements for arrangement in tandem fashion. The chassis are rigidly secured to each other end to end and are provided with vertical leaf springs attached to deck mountings in the form of pedestals and with horizontal leaf springs attached to the deck at their mid-points. At each of the two ends of the tandem connected chassis a respective resistance strain gauge load cell is provided connected to the deck. Signals from the strain gauges are added algebraically to indicate the tension in a cable being laid or recovered. Compensation for the pitching of the ship can be provided by use of a resiliently mounted pendulum.

12 Claims, 6 Drawing Figures

PATENTED APR 9 1974

ERIC F. S. CLARKE,
JAMES E. H. COSIER,
PETER S. HALLS, JAN KOLANOWSKI, &
ALEXANDER D. L. LAIDLAW,
INVENTORS

BY Hall & Houghton
ATTORNEY

ERIC F.S. CLARKE, JAMES E.H. COSIER,
PETER S. HALLS, JAN KOLANOWSKI & ALEXANDER P.L. LAIDLAW,
INVENTORS

BY *Hall & Houghton*
ATTORNEY

TENSION MEASURING MEANS FOR SUBMARINE CABLES

This invention relates to apparatus for use in the laying or recovery of submarine cables.

Cable-laying ships are provided with special equipment, generally termed cable engines, which allow cable to be paid out (or hauled in) at a controlled rate to (or from) the sea bed. The simplest type of cable engine is a rotatable sheave but all cable engines are operative to apply traction to the cable surface for braking or hauling the cable. The traction of the cable engine is opposed by the length of cable positioned on the sea bed and therefore during the laying or recovery a state of tension exists in the cable. It is clearly important that the cable tension should not reach a value so great as to cause deformation or damage to the cable and it is therefore an object of the invention to provide an apparatus enabling cable tension to be monitored.

The present invention provides a cable engine mounting including a deck mounting for securing the cable engine mounting to the deck of a ship and a mounting arrangement to which a cable engine assembly can be secured, characterised in that the mounting arrangement is supported on the deck mounting by resilient support means arranged to have resiliency in a direction which, in use, corresponds to the cable axis and that monitoring apparatus is provided to produce a signal representative of the movement of the mounting arrangement relative to the deck mounting so as to indicate the tension in a cable being laid or recovered.

The mounting arrangement can comprise a chassis adapted to receive a cable engine assembly and the resilient support means can comprise a leaf spring mounting connecting the chassis to the deck mounting.

The monitoring apparatus can comprise a load cell having one end arranged for attachment to the deck and the other end attached to the chassis.

A described embodiment comprises a cable engine mounting for use with a cable engine assembly comprising a plurality of modules containing cable traction and guide elements for arrangement in tandem fashion. A respective mounting chassis is provided for each module and the chassis are rigidly secured to each other end to end. The chassis are provided with leaf spring mountings comprising vertical leaf springs attached to deck mountings in the form of pedestals and horizontal leaf springs attached to the deck at their mid-points. At each of the two ends of the tandem connected chassis a respective load cell is provided connected to the deck. The load cells contain resistance type strain gauges which provide signals which when added algebraically by means of suitable instrumentation provide an indication of the tension in a cable being laid or recovered. A resiliently mounted pendulum can be used to provide compensation for pitching of the ship.

By way of example only, an illustrative embodiment will now be described with reference to the accompanying drawings of which:

The present embodiment is designed for use with a multi-modular cable engine such as is described and claimed in co-pending Pat. Application No. 67941 (issued Feb. 6, 1973 as U.S. Pat. No. 3,715,068) the disclosure and drawings of which are incorporated herein by reference.

A cable engine described in the said co-pending Patent Application comprises a syytem of traction wheels spaced relatively widely apart and with an assembly of guide rollers between each pair of traction wheels to maintain the general alignment of the cable relative to the traction wheels during the laying or recovery of a cable. The components for the engine are arranged in associated groups or modules. In a typical arrangement four modules are used and a mounting arrangement for four such modules will now be described.

Figure 1:
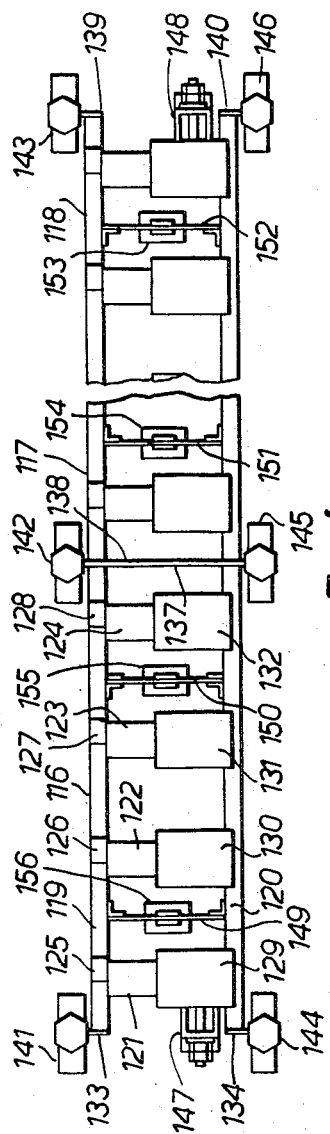
FIG. 1 shows a cable engine mounting which embodies the invention.

Referring to FIG. 1, references 116, 117, 118 indicate first, second and fourth modules mounting chassis arranged in tandem (the third module chassis not being shown). Module chassis 116 has two frame member 119 and 120 which extend lengthwise of the module (not shown) and four bridging members 121, 122, 123 and 124. These members are of rectangular hollow steel section secured together by welding and strengthened by corner webs (not shown). Mounting pillars, also of rectangular hollow section, adapted to carry respective pairs of traction wheels (not shown) are similarly secured to the chassis members 119 at 125, 126, 127 and 128. Mounting plates such as 129, 130, 131 and 132 are provided to receive respective guide roller assemblies. These mounting plates are secured in overlapping relationship to the frame members 120 and the respective bridging members 121–124. For a fuller description of the traction wheels and guide roller assemblies reference should be made to the said co-pending Pat. Application.

Figure 5:
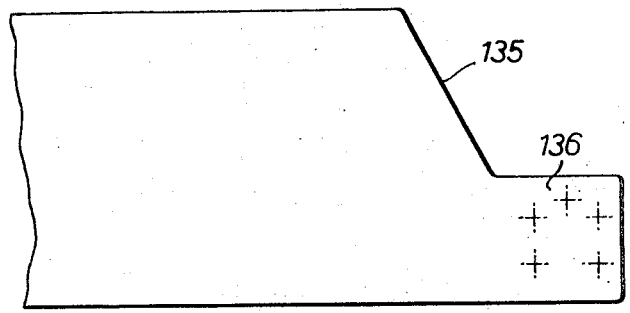

At the left-hand end of module chassis 116, as viewed in FIG. 1, the frame members 119 and 120 are provided with end plates 133 and 134. These end plates cover the ends of the respective chassis members and also provide laterally projecting lugs of the form shown in FIG. 5, which show in elevation the laterally projecting part of an end plate and which comprises a downwardly sloping part 135 and a lug part 136, the latter being provided with five bolt holes as shown. The right-hand end of module chassis 116 is provided with a rectangular end plate 137 which extends across the whole width of the module chassis while the left-hand end of module 117 is provided with an end plate 138 which is similar to the end plate 137 but, additionally, provides lugs of the form shown in FIG. 5, which project laterally from each side of the module. The junction between the chassis of module 117 and the chassis of the third of the four chassis modules (not shown) and between the chassis of the third and fourth modules, i.e., module 118 in FIG. 1, is effected in the same manner as described for the junction between the chassis of the modules 116 and 117. The right-hand end of the module chassis 118 is terminated by end plates 139 and 140, of the same form as the end plates 133 and 134.

The respective end plates are welded to the associated chassis members and for the assembly of the module chassis together the abutting end plates are bolted together by bolts (not shown).

For the installation of the multi-modular cable engine on board a cable ship, the chassis modules are raised clear of the deck and the projecting lug parts are bolted respectively to the free ends of vertical leaf springs which depend within supporting pedestal members such as the members 141 to 146, FIG. 1. The pedestal members are bolted to the deck structure which can be modified to provide suitable fixing stools as required. With this arrangement the whole cable engine assembly is free to swing longitudinally under the varying stresses applied to it during the laying or recovery of a submarine cable. However, this longitudinal movement is limited by providing stays at each end of the cable engine assembly which effectively tether the assembly against excessive swing. The stays incorporate load cells as indicated at 147 and 148, FIG. 1, and described in greater detail below with reference to FIG. 4. The load cells incorporate strain measuring elements to enable an indication to be provided of the tethering stress applied to each end of the cable engine, and enables this to be pre-set to a specified value.

Figure 2:
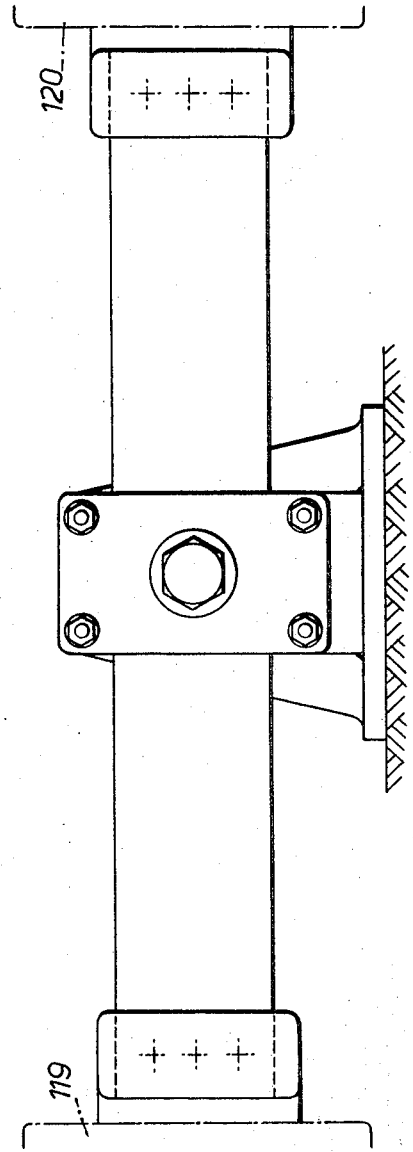
FIGS. 2 to 6 show details of the apparatus of FIG. 1.

To counter any tendency of the cable engine to swing laterally due to a rolling motion of the cable ship at sea, horizontally orientated leaf spring tethering members such as 149, 150, 151 and 152 are provided. Each module chassis is provided with two such tethering members as shown or module chassis 116 in FIG. 1, and each tethering member is clamped over a central region of its length to a pedestal member as indicated at 153, 154, 155 and 156, each pedestal being secured to the deck structure in a similar manner to that above described for the supporting pedestals 141–146. The extremities of the spring tethers are bolted to angle brackets which are welded to the inwardly facing sides of the longitudinally extending chassis frame members. The construction and assembly of these horizontal leaf spring members with their associated clamping pedestals will be clear on examination of FIG. 2, without the need for detailed description. It will be appreciated that the horizintal leaf spring tethering arrangement shown is effective only in preventing lateral swing of the cable engine and does not impede its longitudinal movement. Also, by clamping the leaf spring tethering members to their clamping pedestals after the cable engine has been suspended from the supporting pedestals 141–146 as above described, it is ensured that the horizontal leaf springs do not play any part in supporting the weight of the cable engine assembly.

Now that the mounting arrangement has been generally described, specific components will be treated in further detail.

Figure 3:
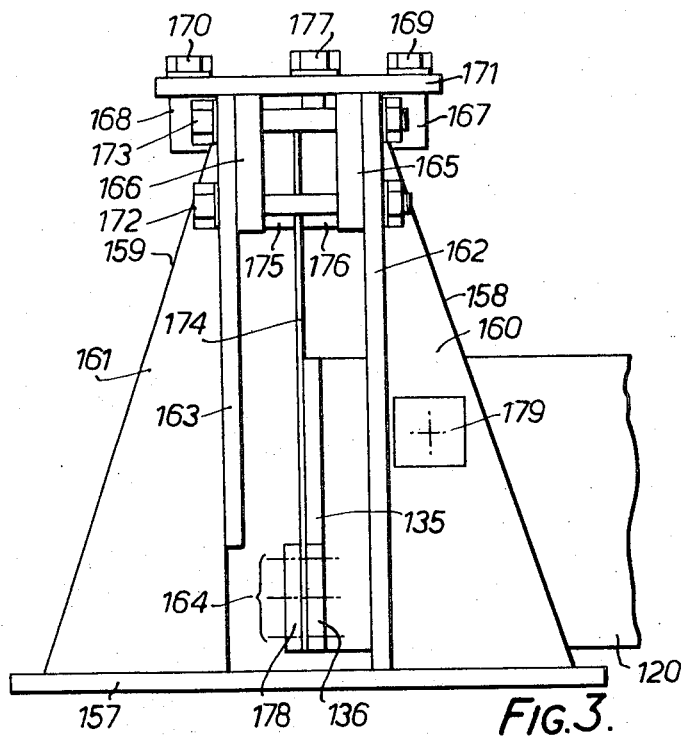

Referring to FIG. 3, the supporting pedestals indicated at 141–146 (FIG. 1) comprise a base plate 157 to which two vertically extending pedestal frame members 158 and 159 are welded. Each frame member comprises two webs of triangular formation, of which only one for each frame member and respectively designated 160 and 161 is seen in the drawing. These webs are welded to respective ones of laterally extending plates 162 and 163 respectively, the plate 163 being made short as shown to provide access to the bolts indicated at 164. Also welded to the upper ends of these laterally extending plates are spacing blocks 165 and 166, and bosses 167 and 168, the latter being provided with threaded bolt holes to accept bolts 169 and 170, by means of which a cap plate 171 is secured to the upper ends of the frame members 162 and 163. The upper ends of these frame members are also linked together by four clamping bolts of which only two, designated 172 and 173 are seen in the drawing. A flat leaf spring 174 of rectangular form is clamped at one end between clamping blocks 175 and 176 by means of a centrally positioned recessed bolt, not shown, and the clamping block 176 is provided with two threaded bolt holes in its upper face, in positions to accept two adjusting bolts of which only one, designated 177, is seen in the drawing. The outwardly facing sides of the clamping blocks 175 and 176 are each formed with a centrally positioned, vertically extending tenon and these locate in correspondingly located mortices formed in the inwardly facing sides of the spacing blocks 165 and 166, the dimensions being such that with the clamping bolts 172 and 173 slackened off, the sub-assembly comprises the clamping blocks 175, 176 together with the leaf spring 174, is a sliding fit between the spacing blocks 165 and 166, while with the clamping bolts 172 and 173, and the corresponding pair not seen in the drawing, the upper ends of the members 162 and 163 can be distorted inwardly far enough to firmly clamp the leaf spring sub-assembly in any set position. At their free ends, the leaf spring members are clamped between a clamping plate 178 and a lug 136, which as described above with reference to FIGS. 1 and 5 projects from the chassis framework into association with the respective supporting pedestal. By this means the cable engine assembly is suspended by the leaf spring members 174 provided in each of the supporting pedestals such as 141–146 (FIG. 1) associated with the overall cable engine assembly. Also, resistance type strain gauge elements (not shown) are cemented along an intermediate portion of the length of the leaf springs 174 to enable an indication to be provided of the loading applied to the associated leaf spring by the cable engine assembly whereby an adjustment of the adjusting bolts 177 at each pedestal, the weight of the cable engine assembly can be distributed equally over all the supporting pedestal elements. The pedestal web members 160 are also provided with a reinforced bolt hole 179 to enable the cable engine to be clamped by means of a suitable set bolt to the supporting pedestals when the cable engine is not in use. The pedestals (with the exception of those at the inboard extremity) can be provided with respective stools of graded heights. The height can progressively increase according to distance from the inboard extremity, whereby the cable engine is given an inclination to the horizontal such that the line of the cable path through the engine during laying or recovery meets the main cable sheave (bar or stern) at a tangent.

Figure 4:
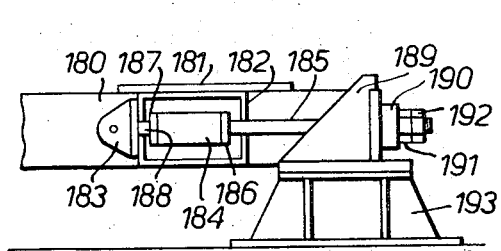

Referring now to FIG. 4, this shows in more detail the load cell tethers described above and indicated at 147 and 148, FIG. 1, and is a view of the load cell mounting arrangements as seen with the frame member corresponding to the frame member 120 (FIG. 1) removed. Thus, the frame member 180 shown in FIG. 4 corresponds to the inwardly facing wall of frame member 119 (FIG. 1), the mounting plate 181 corresponds to a mounting plate such as 129 (FIG. 1) while the frame member 182 corresponds to a chassis cross member such as 121 (FIG. 1). The load cell tether, comprises a load cell indicated at 184, together with stay rods 185 and 188, the load cell 184 being located within the hollow rectangular section of the cross-members 182, the vertical walls of which are slotted to accept the stay rods. The load cell is available as a proprietary component and comprises a simple cylinder having a suitable modulus of elasticity. To the inside surface of the load cell are secured resistive strain gauge measuring elements so as to lie parallel with the cylinder axis. End caps 186 and 187 formed integral with the stay rods 185 are screwed into the ends of the load cell cylinder. The stay rod 188 is terminated in a circular eye piece which is located between a pair of lugs, only the near side lug 183 is visible in FIG. 4. The two lugs are welded to the rear facing wall of the cross member 182, and an eye bolt, not shown, passes through the lugs and the intervening stay rod eye to secure the cable engine end of the stay. The stay rod 185 which forms the cable ship end of the stay is located in a greased packed bearing 190 carried by a welded supporting bracket 189 which is bolted to supporting stool 193 which, in turn, is bolted to the deck structure. The outer end of the stay rod 185 is threaded to accept the tensioning nuts 191 and 192, by means of which the stay can be stressed to a specified, predetermined amount, as indicated by the strain gauge associated with the load cell. The operation of the load cell tethers will now be explained by means of a specific example.

Figure 6:
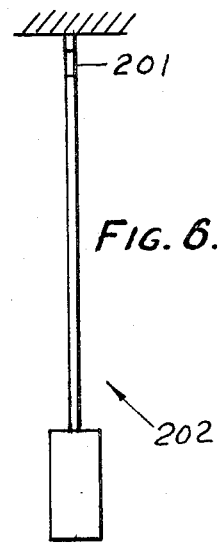

In a a particular case where the maximum cable tension which can be tolerated is 10 tons, then the tethering stress applies to each end of the cable engine is pre-set to 7.5 tons. If during the laying or recovery of a submarine cable, the tension in the cable at the point where it leaves or enters the cable engine, i.e., at the outboard end thereof, is, say, 4 tons, then the stress in the tether at the outboard end of the cable engine will fall to 6.5 tons, while the stress in the tether at the inboard end will rise to 9.5 tons, the cable tension at the inboard end of the cable engine being zero. By adding the strain gauge indication from the load cells, algebraically an indication of the cable tension is obtained and this may be displayed continuously by suitable instrumentation incorporated within a separate control console. Suitable resistive strain gauge elements are available as proprietary articles and the associated electrical or electronic circuit means required to enable the required stress indications to be provided will be readily apparent to those skilled in the art. These elements are therefore not described in detail in this Specification. Also, to counter the fluctuations in the cable stress readings obtained due to the pitching action of the cable ship at sea, a further strain gauge 201 (FIG. 6) can be provided in association with a pendulum means 202 attached to a bulkhead of the ship and the output from this strain gauge is connected in opposition to the output from the load cell strain gauges, so that a steady reading of cable tension is always provided. It will be appreciated that, so long as the maximum cable tension remains within the tolerated limit, the stresses applied at each end of the cable engine are always in balance and consequently any longitudinal movement of the cable engine will be very small and not more than a few thousandths of an inch.

While the invention has been described in terms of a preferred embodiment, it should be appreciated that other forms and variations are possible. For example, instead of mounting the pedestals externally on each side of the chassis, the pedestals can be located adjacent the main chassis members, internally of the chassis.

In particular, other types of cable engine assembly besides that described may advantageously be used with the present invention. For example, apparatus described in British Pat. Specification Nos. 823,138, 826,974 and 847,085 is also suitable. Furthermore, the invention is particularly suited to the type of cable engine which employs a Caterpillar track for the application of traction to a cable (for example, the cable engine described in British Pat. Specification No. 734,082).

It will be apparent that a mounting including a single load cell could be used, cable tension being the difference between the instantaneous reading and a pre-set value for zero cable tension.

We claim:

1. Apparatus for the laying or recovery of cables comprising:
   a cable engine,
   a chassis mounting the engine,
   a plurality of deck mountable pedestals,
   a respective leaf-spring connected from each pedestal to the chassis and having resiliency in one direction only which corresponds to the cable axis, and
   monitoring apparatus including a pair of load cells each deck attachable at one of their ends and each connected at the other of their ends to a respective end of the chassis and responsive in use to movement of the chassis relative to the pedestals to produce a signal representative of the tension in the cable being laid or recovered.

2. Apparatus as claimed in claim 1 including a further leaf spring having resiliency in the said one direction attached at its ends to the chassis and provided with a deck attachment at its mid-point.

3. Apparatus for the laying or recovery of cables comprising:
   a cable engine,
   means mounting the cable engine,
   deck mounting means,
   resilient support means connected from the cable engine mounting means to the deck mounting means and having resiliency in one direction only which corresponds to the cable axis, and
   monitoring apparatus including a pair of load cells each connected at one end to the cable engine mounting means to monitor relative movement of the cable engine mounting means and the deck mounting means to produce a signal representative of the tension in the cable being laid or recovered.

4. Apparatus for the laying or recovery of cables from a ship at sea, the apparatus comprising:
   a cable engine,
   means mounting the cable engine,
   deck mounting means for attachment to the deck of the ship,
   resilient support means connected from the cable engine mounting means to the deck mounting means and having resiliency in one direction only which corresponds to the cable axis,
   monitoring apparatus responsive to movement of the cable engine mounting means relative to the deck mounting means to produce a signal indicative of tension in the cable being laid or recovered, and
   compensation means connected to the monitoring means to compensate the signal for pitching at sea, the compensation means including a resiliently mounted pendulum.

5. Apparatus for the laying or recovery of cables from a ship at sea, the apparatus comprising:

a cable engine comprising a plurality of similar cable engine modules arranged tandem fashion to cooperate with each other, a respective chassis mounting each module, the chassis being rigidly secured to each other end to end, deck mounting pedestals for attachment to the deck of the ship, resilient support means comprising leaf springs connected from the ends of the chassis to respective ones of the deck mounting pedestals, said resilient support means having resiliency in one direction only which corresponds to the cable axis, and monitoring apparatus responsive to movement of the chassis relative to the deck mounting pedestals to produce a signal indicative of tension in the cable being laid or recovered.

6. Apparatus as claimed in claim 5 including a plurality of further leaf springs, each leaf spring having resiliency in the said one direction and being attached at its ends to an associated chassis intermediate the ends thereof, each leaf spring being provided with a deck attachment at its mid-point.

7. A cable laying or recovery ship including:
a cable engine,
means mounting the cable engine,
resilient support means connected from the cable engine mounting means to the deck of the ship and having resiliency in one direction only which corresponds to the cable axis,
monitoring apparatus responsive to movement of the cable engine mounting means relative to the deck of the ship to produce a signal indicative of tension in the cable being laid or recovered.

8. A ship as claimed in claim 7 wherein the resilient support means comprises a plurality of leaf springs connected from the cable engine mounting means to the deck mounting means.

9. A ship as claimed in claim 7 wherein the monitoring apparatus includes a strain gauge connected to the cable engine mounting means.

10. A ship as claimed in claim 7 wherein the cable engine is mounted on a chassis.

11. A ship as claimed in claim 10 wherein the monitoring apparatus includes a load cell attached at one of its ends to the chassis and having deck attachment means at its other end.

12. A ship as claimed in claim 7 wherein the cable engine is a plurality of similar cable engine modules arranged tandem fashion to co-operate with each other, each module is mounted on a respective chassis, the chassis are rigidly secured to each other end to end, and each chassis is mounted on leaf springs.

* * * * *